3,576,811
1-ALKYL-1-(β-PIPERIDINO-ETHYL)-1,2,3,4-
TETRAHYDRONAPHTHALEN-2-ONES
Raffaello Fusco, Milan, and Franco Tenconi, Monza,
 Italy, assignors to Warner-Lambert Pharmaceutical
 Company, Morris Plains, N.J.
No Drawing. Filed May 6, 1968, Ser. No. 727,060
Claims priority, application Great Britain, May 5, 1967,
 21,041/67
Int. Cl. C07d 29/20
U.S. Cl. 260—294.7                     13 Claims

ABSTRACT OF THE DISCLOSURE

There have been prepared new 1-alkyl-1-(β-piperidino-ethyl) - 1,2,3,4 - tetrahydro-naphthalen-2-ones and pharmaceutically acceptable acid addition salts thereof having antitussive activity. They are obtained by reacting the corresponding 1 - alkyl-1,2,3,4-tetrahydro-naphthalen-2-ones with a β-haloethyl-piperidine in the presence of an alkaline condensing agent. The new compounds may be formulated as pharmaceutical compositions with any of the conventional pharmaceutically acceptable carriers for oral, parenteral or rectal use.

---

The present invention is concerned with new 1,2,3,4-tetrahydro-naphthalen - 2-ones, with a process for their preparation and with pharmaceutical compositions containing them as active ingredients.

More particularly the invention relates to 1-alkyl-1-(β-piperidino-ethyl)-1,2,3,4-tetrahydro-naphthalen-2-ones of formula:

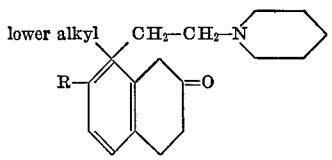

I wherein R represents a hydrogen or halogen atom or a methoxy group, and to the pharmaceutically acceptable acid addition salts thereof.

The term "lower alkyl" as used herein and in the claims refers to radicals containing not more than 3 carbon atoms. Acids from which pharmaceutically acceptable acid addition salts of the products of the invention can be prepared are those which form non-toxic acid addition salts containing inorganic or organic pharmaceutically acceptable anions, such as the hydrochloride, hydrobromide, hydroiodide, sulphate or bisulphate, phosphate or acid phosphate, acetate, maleate, lactate, tartrate, citrate, gluconate, saccharate, cyclohexane sulphamate, methane and p-toluene sulphonate salts, the hydrohalic acid addition salts, particularly the hydrochlorides, being preferred.

Among the compounds of Formula I, the 1-methyl-1-(β-piperidino-ethyl) - 1,2,3,4 - tetrahydro-naphthalen-2-one and its pharmaceutically acceptable acid addition salts are particularly preferred.

The new compounds of the present invention are prepared by treating the corresponding 1-alkyl-1,2,3,4-tetrahydro-naphthalen-2-ones of formula:

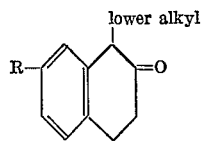

II wherein R has the meaning defined hereinabove, with a 1-(β-haloethyl)-piperidine of formula:

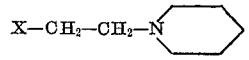

III wherein X represents a halogen atom, preferably chlorine or bromine, in the presence of an alkaline condensing agent and eventually converting the products thus obtained into their pharmaceutically acceptable acid addition salts.

The reaction is carried out in an anhydrous inert organic solvent, preferably in a hydrocarbon solvent, such as hexane, isooctane, benzene, toluene or xylene. Generally the alkaline condensing agent is an alkali metal hydride, such as sodium or potassium hydride, preferably as oily suspension, but also a metal such as lithium, sodium or potassium or an alkali metal amide, such as sodium amide, can be advantageously used as suitable condensing agent.

The haloethyl-piperidine of Formula III is generally added in equimolecular amount or in small excess into the solution containing the starting product and the mixture is maintained at a temperature ranging from 25 to 120° C. for about 2–8 hours. At the end of the reaction the final product is isolated according to conventional methods, for example by evaporation, neutralisation and extraction of the residue with a suitable solvent, further evaporation and final distillation or crystallization.

The 1-alkyl-1-(β-piperidino-ethyl) - 1,2,3,4 - tetrahydro-naphthalen-2-ones thus obtained can be treated according to conventional methods with a suitable organic or inorganic acid, and converted into their corresponding pharmaceutically acceptable acid addition salts.

The new 1-alkyl-1-(β-piperidino-ethyl) - 1,2,3,4 - tetrahydro-naphthalen-2-ones of Formula I and their pharmaceutically acceptable acid addition salts posses a remarkable antitussive activity. They can be included, together with pharmaceutically acceptable carriers or diluents into pharmaceutical compositions for oral, parenteral or rectal use.

The active compounds can be administered as syrups in admixture with sweetening, flavouring, preserving and emulsifying agents; further they can be mixed with talc, stearic acid, magnesium stearate, lactose, calcium carbonate, starch or like substances to prepare tablets, pills or other solid dosage unit forms suitable for oral ingestion.

Compositions for parenteral use are prepared by mixing the active ingredients with liquid carriers, for example water, glycols or vegetable oils to obtain injectable solutions or suspensions. The compounds may also be presented in suppositories by incorporation in a suppository base, for example cocoa butter, beeswax, higher aliphatic alcohols, glycols, cholesterol, zinc stearate and like.

Generally the compositions contain the active ingredient in an amount of from 0.1 to 500 mg., preferably from 1 to 150 mg. per dosage unit. In the case of syrups the unit dosage is a teaspoonful or a tablespoonful. The administration is advantageously in equal dose one or more times daily to give a daily dosage of from 1 mg. to 1 g. and preferably from 10 to 450 mg.

The compositions can also contain other therapeutic substances; for example expectorants, antibiotics or also sulfonamides may be added to the compositions according to the invention.

The following examples illustrate the invention.

EXAMPLE 1

In a suspension of 4.8 g. of sodium hydride (50% in oil) in 50 cc. of anhydrous toluene there are dropped under stirring 16 g. of 1-methyl-1,2,3,4,-tetrahydronaphthalen-2-one in 50 cc. of anhydrous toluene. The mixture is maintained for about 1 hour under stirring, then refluxed for two hours. After cooling there are added 16.2 g. of 1-(β-chloroethyl)-piperidine in 100 cc. of anhydrous toluene and the mixture is refluxed for about 4 hours. The solvent is removed under vacuum and the residue is taken up with dilute hydrochloric acid and extracted with ether. The aqueous phase is made alkaline then extracted with ether. The ethereal extracts are collected, washed with water and dried under vacuum. After evaporation of the solvent, the residue is distilled under vacuum to give 1-methyl-1-(β-piperidino-ethyl)-1,2,3,4-tetrahydro-naphthalen-2-one, B.P. 133–135° C./0.01 mm. Hg. Yield 60% of the theoretical.

In the same manner there are obtained the 7-methoxy-1-methyl-1-(β - piperidino - ethyl) - 1,2,3,4 - tetrahydro-naphthalen-2-one, B.P. 175–178° C./0.01 mm. Hg; the 1-propyl-1-(β-piperidino - ethyl) - 1,2,3,4 - tetrahydro-naphthalen-2-one, B.P. 152–154° C./0.01 mm. Hg and the 1-ethyl-1-(β-piperidino - ethyl) - 1,2,3,4 - tetrahydro-naphthalen-2-one, B.P. 147–148° C./0.01 mm. Hg. This last product solidifies easily and can be crystallized from 60% ethanol; M.P. 75° C.

EXAMPLE 2

To a suspension of 4.8 g. of sodium hydride (50% in oil) in 50 cc. of anhydrous toluene there are added slowly under stirring 20.4 g. of 7-methoxy-1-ethyl-1,2,3,4-tetrahydro-naphthalen-2-one in 50 cc. of anhydrous toluene. The mixture is let to stand at room temperature for about 1 hour then is refluxed for two hours. After cooling, 16.2 g. of a solution of 1-(β-chloroethyl)-piperidine in 100 cc. of anhydrous toluene are added slowly and the mixture is refluxed for 4 hours. After evaporation of the solvent under vacuum, the residue is taken up with dilute hydrochloric acid and extracted with ether. The ethereal extracts are collected, dried and evaporated. The residue, taken up with little 60% ethanol gives the 7-methoxy-1-ethyl - 1 - (β - piperidino - ethyl) - 1,2,3,4 - tetrahydro-naphthalen-2-one, M.P. 91–92° C. Yield 65%.

EXAMPLE 3

To a suspension of 4.8 g. of sodium hydride (50% in oil) in 50 cc. of anhydrous toluene there is added slowly under stirring a solution in 50 cc. of anhydrous toluene of 19.4 g. of 7-chloro - 1 - methyl - 1,2,3,4 - tetrahydro-naphthalen-2-one (M.P. 74° C.), obtained by treating 7-chloro-1,2,3,4-tetrahydro-naphthalen-1-one with methylmagnesium iodide, dehydrating the 7-chloro - 1 - methyl-1,2,3,4-tetrahydro-naphthalen-1-ol thus obtained, epoxydizing with perbenzoic acid and hydrolyzing, according to the procedure described in J. Chem. Soc., 1958, 1248. The mixture is stirred for about 1 hour, then refluxed for two hours. After cooling there are added 16.2 g. of 1-(β-chloroethyl)-piperidine in 100 cc. of anhydrous toluene and the mixture is worked as in Example 1 to give in about 50% yield the 7-chloro-1-methyl-1-(β-piperidino-ethyl)-1,2,3,4-tetrahydro - naphthalen - 2 - one, B.P. 154–156° C./0.05 mm. Hg.

In analogous manner, the 7-fluoro-1-methyl-1-(β-piperidino-ethyl)-1,2,3,4-tetrahydro-naphthalen-2-one and the 7-bromo-1-methyl-1-(β-piperidino-ethyl) - 1,2,3,4 - tetrahydro-naphthalen-2-one are obtained.

Analogously, by treating 7-fluoro-1-ethyl-1,2,3,4-tetrahydro-naphthalen-2-one (obtained by treating 7-fluoro-1,2,3,4-tetrahydro-naphthalen-1-one with ethylmagnesium iodide, dehydrating the 7-fluoro-1-ethyl-1,2,3,4-tetrahydro-naphthalen-1-ol thus obtained, epoxydizing with perbenzoic acid and hydrolyzing, according to the procedure described in J. Chem. Soc., 1958, 1248) with 1-β-chloroethyl)-piperidine, the 7-fluoro-1-ethyl - 1 - (β - piperidino-ethyl)-1,2,3,4-tetrahydro-naphthalen - 2 - one is obtained, B.P. 148–150° C./0.05 mm. Hg. The product solidifies easily and can be crystallized from 70% ethanol; M.P. 64° C.

EXAMPLE 4

To a solution of 27.14 g. of 1-methyl-1-(β-piperidino-ethyl)-1,2,3,4-tetrahydro-naphthalen-2-one in 800 cc. of anhydrous ether there is added 0.1 mole of hydrochloric acid in anhydrous ethyl alcohol. The oily precipitate is let to solidify, then it is washed with anhydrous ethyl ether and crystallized from ethyl acetate. Thus, 28.30 g. of 1-methyl-1-(β - piperidino - ethyl) - 1,2,3,4 - tetrahydro-naphthalen-2-one hydrochloride are obtained; M.P. 180–181° C.

In an analogous manner, the 7-chloro-1-methyl-1-(β-piperidino-ethyl)-1,2,3,4-tetrahydro-naphthalen - 2 - one hydrochloride, M.P. 187–188 °C.; the 7-methoxy-1-methyl-1-(β-piperidino-ethyl)-1,2,3,4 - tetrahydro - naphthalen-2-one hydrochloride, M.P. 195–196° C.; the 1-ethyl-1-(β-piperidino-ethyl)-1,2,3,4-tetrahydro-naphthalen - 2 - one hydrochloride, M.P. 154–156° C.; and the 1-propyl-1-(β-piperidino-ethyl)-1,2,3,4-tetrahydro - naphthalen - 2-one hydrochloride, M.P. 168–170° C. are obtained.

Similarly, by treatment with the appropriate acid, the hydrobromic, hydriodic, lactic, citric, tartaric, sulphuric and methane sulfonic acid addition salts of the above compounds are prepared.

EXAMPLE 5

Tablets for oral use are prepared from the following ingredients:

|  | Mg. |
|---|---|
| 1-methyl-1-(β-piperidino - ethyl) - 1,2,3,4 - tetrahydro-naphthalen-2-one | 25.0 |
| Lactose | 50.0 |
| Corn starch | 100.0 |
| Aerosol compositum (Degussa, Frankfurt, Germany) | 15.0 |
| Magnesium stearate | 0.5 |
| Talc | 9.5 |
|  | 200.0 |

The ingredients are throughly mixed and pelleted. The pellets are broken up by forcing through a screen. The resulting granules are then compressed into tablets, each tablet containing 25 mg. of active substance.

EXAMPLE 6

To produce a cough syrup, 20 g. of 1-methyl-1-(β-piperidino-ethyl)-1,2,3,4-tetrahydro-naphthalen - 2 - one, 40 g. of methyl-p-hydroxybenzoate, 20 g. of propyl-p-hydroxy-benzoate and 5,000 g. of crystallized sugar and a flavouring agent are dissolved in distilled water up to 10 liters.

We claim:

1. A member selected from the group consisting of a compound of formula:

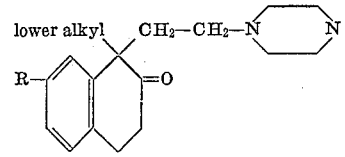

wherein R is selected from the group consisting of hydrogen, halogen and methoxy; and a pharmaceutically acceptable acid addition salt thereof.

2. A member selected from the group consisting of 1-methyl - 1 - (β-piperidino-ethyl) - 1,2,3,4 - tetrahydro-naphthalen - 2d - one and a pharmaceutically acceptable addition salt thereof.

3. 1 - methyl - 1 - (β-piperidino-ethyl) - 1,2,3,4-tetrahydronaphthalen-2-one.

4. 1 - methyl - 1 - (β-piperidino-ethyl) - 1,2,3,4 - tetrahydro-naphthalen-2-one hydrochloride.

5. 1 - ethyl - 1 - (β-piperidino-ethyl) - 1,2,3,4-tetrahydro-naphthalen-2-one.

6. 1 - ethyl - 1 - (β-piperidino-ethyl) - 1,2,3,4 - tetrahydro-naphthalen-2-one hydrochloride.

7. 7 - methoxy - 1 - methyl - 1 - (β-piperidino-ethyl)-1,2,3,4-tetrahydro-naphthalen-2-one.

8. 7 - methoxy - 1 - methyl - 1 - (β-piperidino-ethyl)-1,2,3,4-tetrahydro-naphthalen-2-one hydrochloride.

9. 7 - methoxy - 1 - ethyl - 1 - (β-piperidino-ethyl)-1,2,3,4-tetrahydronaphthalen-2-one.

10. 1 - propyl - 1 - (β-piperidino-ethyl) - 1,2,3,4-tetrahydro-naphthalen-2-one.

11. 1 - propyl - 1 - (β-piperidino-ethyl) - 1,2,3,4-tetrahydro-naphthalen-2-one hydrochloride.

12. 7 - chloro - 1 - methyl - 1 - (β-piperidino-ethyl)-1,2,3,4-tetrahydro-naphthalen-2-one.

13. 7 - chloro - 1 - methyl - 1 - (β-piperidino-ethyl)-1,2,3,4-tetrahydro-naphthalen-2-one hydrochloride.

References Cited

UNITED STATES PATENTS

| 1,915,334 | 6/1933 | Salzberg et al. | 260—243 |
| 2,075,359 | 3/1937 | Salzberg et al. | 424—250 |

OTHER REFERENCES

Chemical Abstracts, vol 56: 14341 e, June 1962, Saito et al.

Chemical Abstracts, vol. 41: 955c, 1947, Barltrop.

HENRY R. JILES, Primary Examiner

S. D. WINTERS, Assistant Examiner

U.S. Cl. X.R.

260—293.4, 294; 424—267

UNITED STATES PATENT OFFICE
CERTIFICATE OF CORRECTION

Patent No. 3,576,811                    Dated April 27, 1971

Inventor(s) Raffaello Fusco and Franco Tenconi

It is certified that error appears in the above-identified patent and that said Letters Patent are hereby corrected as shown below:

Column 1, the formula appearing between lines 35-43 should be amended as follows:

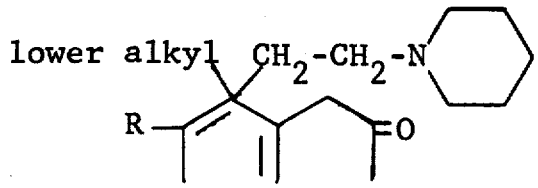

should be

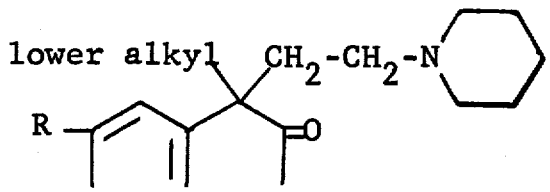

Column 4, Claim 1, the formula should be amended as follows:

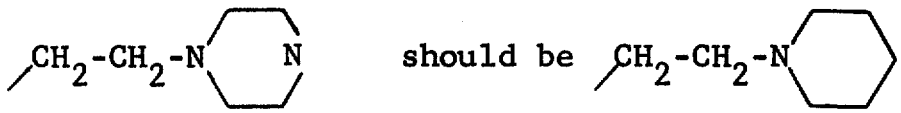

Column 4, Claim 2, line 66, "naphthalen-2d-one" should read ---naphthalen-2-one---.

Signed and sealed this 14th day of December 1971.

(SEAL)
Attest:

EDWARD M. FLETCHER, JR.          ROBERT GOTTSCHALK
Attesting Officer                 Acting Commissioner of Pate